United States Patent

Monz et al.

[11] Patent Number: 6,133,998
[45] Date of Patent: Oct. 17, 2000

[54] METHOD AND DEVICE FOR TARGET SEEKING FOR GEODETIC DEVICES

[75] Inventors: Ludwin-Heinz Monz; Bernd Donath; Hermann Goering; Steffen Laabs; Thomas Marold; Marcel Seeber, all of Jena, Germany

[73] Assignee: Carl Zeiss Jena GmbH, Jena, Germany

[21] Appl. No.: 09/126,211

[22] Filed: Jul. 30, 1998

[30] Foreign Application Priority Data

Aug. 1, 1997 [DE] Germany ............... 197 33 491

[51] Int. Cl.⁷ .................. G01B 11/26; G01C 1/00
[52] U.S. Cl. ................... 356/141.4; 356/141.1
[58] Field of Search .............. 356/141.1–141.5, 356/152.1–152.3

[56] References Cited

U.S. PATENT DOCUMENTS

| | | |
|---|---|---|
| 3,671,963 | 6/1972 | Assouline et al. |
| 3,687,556 | 8/1972 | Price et al. |
| 4,007,991 | 2/1977 | Robertsson . |
| 4,020,339 | 4/1977 | Gustafson . |
| 4,113,381 | 9/1978 | Epstein . |
| 4,218,138 | 8/1980 | Robertsson . |
| 4,486,095 | 12/1984 | Mitchelson . |
| 5,100,229 | 3/1992 | Lundberg et al. |
| 5,294,970 | 3/1994 | Dornbusch et al. |

FOREIGN PATENT DOCUMENTS

| | | |
|---|---|---|
| 277965 | 4/1990 | Germany . |
| 9528465 | 2/1997 | Germany . |
| 5322569 | 12/1993 | Japan . |
| 9012284 | 10/1990 | WIPO . |

*Primary Examiner*—Stephen C. Buczinski
*Attorney, Agent, or Firm*—McAulay Nissen Goldberg Kiel & Hand, LLP

[57] ABSTRACT

A method for target seeking in geodetic survey measurements comprises the steps of generating at least a first light bundle by a measurement device from a light source arranged therein, the light bundle periodically pivoting back and forth or revolving about the standing axis of the measurement device and fanning out in the vertical plane and being sent to at least one receiver arrangement arranged in at least one target station arranged at a distance from the measurement device. The steps of the method also include generating an electrical signal when the light bundle hits the receiver arrangement of the at least one target station, conveying these electrical signals generated in the target station, or the time difference determined from these electrical signals to the measurement device through a transmitting device provided in the target station, determining the horizontal angle to the respective sighted target station from the time difference of two electrical signals generated one after the other in time by angles measured or stored at constant time intervals and pivoting a second modulated light bundle at an angle in the vertical plane and sending it in the direction of the target station for determining the vertical angle of the measurement device. Further, when the second light bundle hits the receiver arrangement in the target station, the method includes the step of generating another electrical signal and sending it to the measurement device and determining the vertical angle to the respective target station therefrom in the measurement device. Also disclosed is a device in accordance with the method.

7 Claims, 2 Drawing Sheets

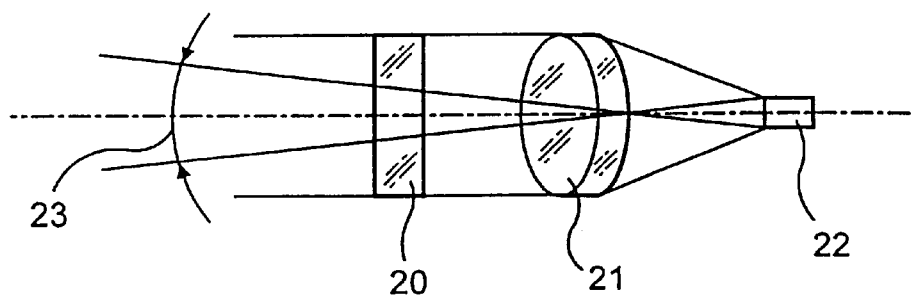
F I G. 3
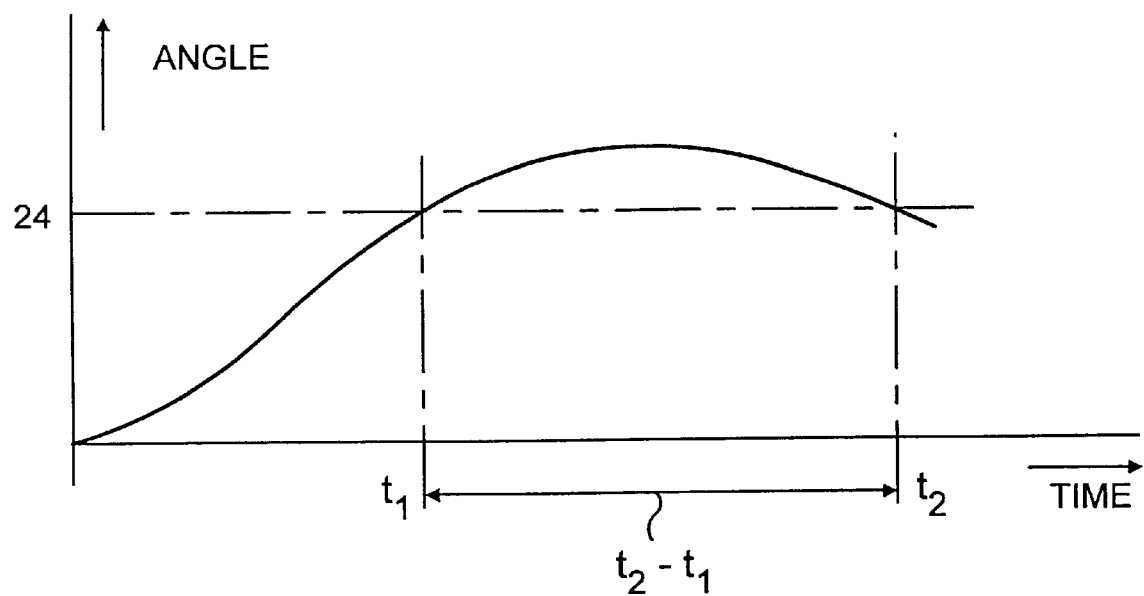
F I G. 4

METHOD AND DEVICE FOR TARGET SEEKING FOR GEODETIC DEVICES

BACKGROUND OF THE INVENTION a) Field of the Invention

The invention is directed to a method and a device for target seeking for geodetic devices, especially tachymeters and theodolites.

b) Description of the Related Art

Tracking devices for tracking a reflector used as a target are known from geodetic devices, especially for tachymeters, wherein these tracking devices are capable of tracking a reflector located in the field of view of the telescope of a geodetic device. Target seeking outside of this field of view is accordingly possible only to a very limited degree. Devices of the type mentioned above are described, for example, in EP 465 584; JP 5-322 569 and DE 195 28 465.

A device for the sighting of a tachymeter from a reflector position is known from DD 156 029. The reflector can be found by transmitting the corresponding angles from the reflector position via radio to a base station in which the tachymeter is located and adjusting the complementary angle at the tachymeter. However, this device is very complicated technically.

Other devices make use of vertically or horizontally fanned out laser pulses which are emitted by the geodetic devices, e.g., theodolites. When the reflector arranged at the target station is hit during the movement around the standing axis or trunnion axis, a signal is generated by a photodiode arranged in the telescope of the theodolite, by means of which signal the drive of the telescope is stopped. A disadvantage in this device consists in that the rotating speed is limited by the pulse repetition frequency and that the system reacts to all reflectors located in the field of view of the telescope, e.g., also reflecting foils, rear reflectors of vehicles or the like objects.

A device of the kind mentioned above is known from the surveying periodical, "Photogrammetrie und Kulturtechnik", 1991, issue 8, pages 427 to 431.

Further, a sighting method for theodolites is known from DD 277 965, wherein, after a visual sighting of the target station with the theodolite, the actual angle measurement is carried out in that an active target beam is emitted by the theodolite and received by an active receiver at the target station. When the precise sighting is acquired, the rotation of the theodolite is stopped.

OBJECT AND SUMMARY OF THE INVENTION

It is the primary object of the invention to provide a method and a device for target seeking for geodetic devices which eliminate the disadvantages of the prior art and which enable an unequivocal sighting of a target station among a plurality of target stations with high accuracy.

In accordance with the invention, a method for target seeking in geodetic survey measurements comprises the steps of generating at least a first light bundle by a measurement device from a light source arranged therein, the light bundle periodically pivoting back and forth or revolving about the standing axis of the measurement device and fanning out in the vertical plane and being sent to at least one receiver arrangement arranged in at least one target station arranged at a distance from the measurement device. The steps of the method also include generating an electrical signal when the light bundle hits the receiver arrangement of the at least one target station, conveying these electrical signals, generated in the target station, or the time difference determined from these electrical signals to the measurement device through a transmitting device provided in the target station, determining the horizontal angle to the respective sighted target station from the time difference of two electrical signals generated one after the other in time by angles measured or stored at constant time intervals and pivoting a second modulated light bundle at an angle in the vertical plane and sending it in the direction of the target station for determining the vertical angle of the measurement device. Further, when the second light bundle hits the receiver arrangement in the target station, the method includes the step of generating another electrical signal and sending it to the measurement device and determining the vertical angle to the respective target station therefrom in the measurement device. The invention further encompasses a device in accordance with the method.

It is advantageous when the measurement device is alerted by the receiver arrangement 11 after a hit and, on the basis of this alert, the rotating direction changes and, after a second hit, the rotation about the vertical or standing axis is terminated.

It is further advantageous that, after the measurement device has moved into the horizontal angle determined in this way, the search in the vertical angle is carried out in the same way with a second modulated light beam which is emitted by the measurement device in the telescope sighting axis and comprehends a search angle of approximately identical magnitude in the horizontal and vertical dimensions.

The arrangement according to the invention includes a telescope which is swivelable about a tilt axis or trunnion axis and forms the measurement station which is connected in a wireless manner with at least one remote target station by a data radio path. In this regard, the geodetic device is mounted so as to be rotatable about a standing axis and comprises means for generating at least one light bundle to be sent to the target station. A receiver arrangement which can generate electrical signals when hit by the light bundles is provided at the target station. The measurement station and target station have transmitting and receiving devices for transmitting information and signals.

In this respect, it is advantageous to provide a transmitting unit connected with the geodetic device for generating a first light bundle which is spread out in the vertical direction and pivotable in the horizontal plane, to provide the telescope of the device which is swivelable about a trunnion axis for generating a second light bundle which is pivotable in the vertical plane, to provide a data radio unit which is arranged at the measurement station and which serves to receive the signals transmitted by the target station, and to arrange a photoelectric receiver arrangement, a reflector and an electronic unit with storage and data radio unit at the target station for storing and conveying data and signals to the measurement station.

Further, it is advantageous that the transmitting unit of the measurement station has a light source, an objective collimating the light, and an optical system which expands the first light bundle in the vertical plane and which has a cylindrical lens.

An advantageous construction results in the target station when the receiver arrangement comprises at that location an objective and an arrangement having CCD elements or a spatially sensitive photoreceiver, wherein a light filter is preferably arranged before the objective and the receiver arrangement is connected with the electronic unit and the data radio unit.

Further, the light of one or both light bundles is advantageously modulated.

The invention will be described more fully hereinafter with reference to an embodiment example.

BRIEF DESCRIPTION OF THE DRAWINGS

In the drawings:

FIG. 3 shows a receiver arrangement for the method according to the invention; and FIG. 4 shows an angle-time diagram.

DESCRIPTION OF THE PREFERRED EMBODIMENTS

Figure 1:
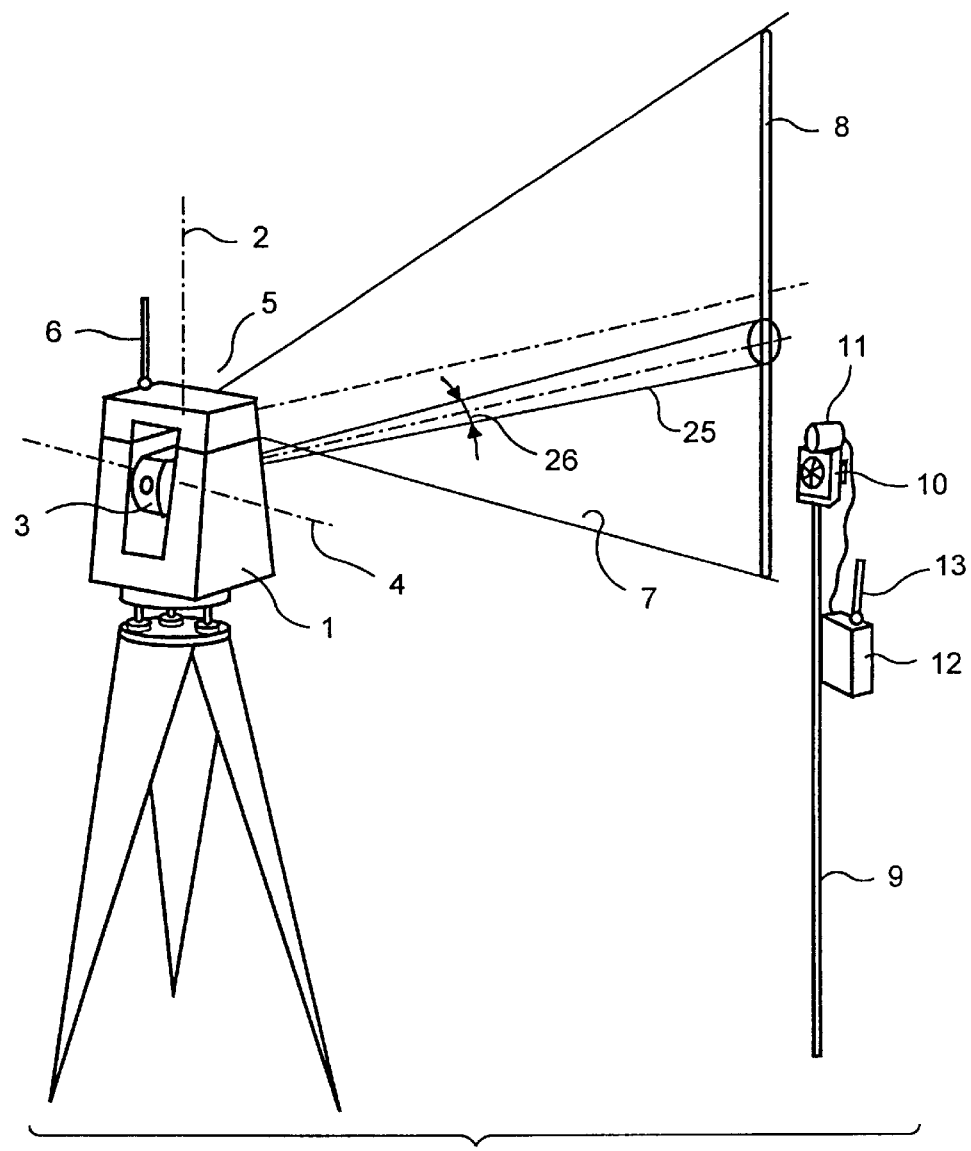
FIG. 1 shows an overview of a measurement arrangement according to the invention.
Figure 2:
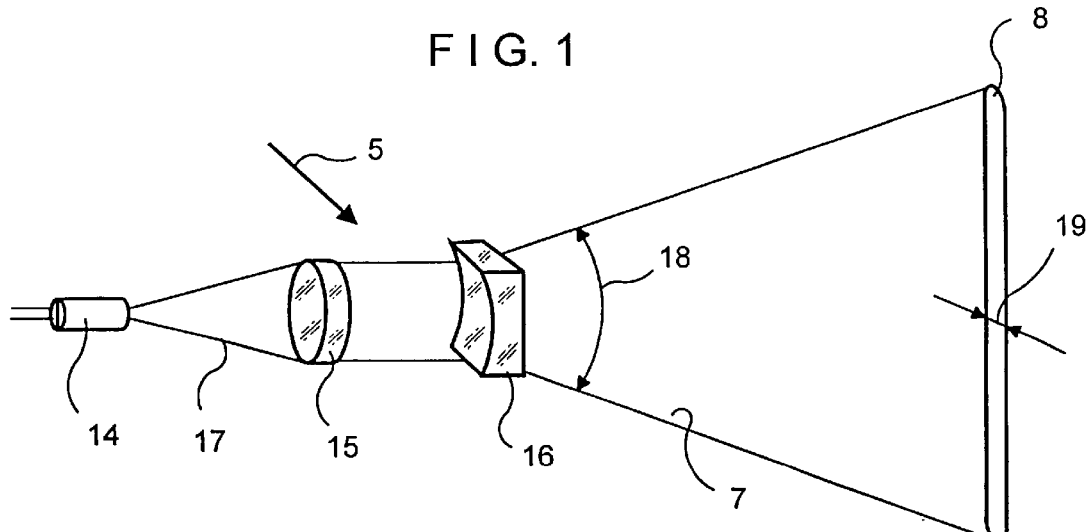
FIG. 2 shows a light source for searching in the horizontal angle.

FIG. 1 shows a measurement device 1, e.g., constructed as a tachymeter 1, which is rotatable about a standing axis 2. A telescope 3 of the tachymeter 1 is rotatable about a trunnion axis 4, wherein the tachymeter 1 is outfitted, in a manner which is known per se and therefore not shown, with divided circles for reading the angles at axes 2 and 4 and motor drives for adjusting the angles at these axes. The telescope further contains distance measuring means, not shown more fully, whose manner of operation is of no significance for the device according to the invention. A transmitting device 5 whose construction is described in more detail in FIG. 2 is fitted to the tachymeter 1. Further, a data radio unit 6 is arranged at the tachymeter 1 or at the transmitting unit 5.

A reflector rod 9 with a reflector 10 which is aligned with the tachymeter by a rodman is present at the target point in a known manner in order to enable measurement of angles and distances from the tachymeter 1 to the reflector 10. A receiver arrangement 11 whose construction is shown in more detail in FIG. 3 is connected with the reflector 10. Further, an electronic unit 12 with a data radio unit or transmitting device 13, represented by its antenna, is present at the reflector rod 9.

The transmitting unit 5 shown in FIG. 2 comprises a laser 14 as a light source, wherein an objective 15 and cylindrical optics, preferably a cylindrical lens 16, are arranged following the laser 14. The laser 14, preferably a laser diode, preferably emits infrared light which is amplitude-modulated at a constant frequency. The objective 15, which is shown here as an individual lens for the sake of simplicity, images the laser 14 approximately to infinity and it accordingly generates a beam with a small aperture angle which is expanded in the vertical direction in the subsequent cylindrical lens 16. The limiting of the light bundle 17 in the transmitting unit 5 is also indicated for explanatory purposes. The expanded first light bundle 7 emitted from the cylindrical lens 16 accordingly has a substantially vertical cross section 8 at the point of a receiver arrangement 11. The aperture angle 19 in the horizontal direction is therefore as small as possible, while the aperture angle 18 in the vertical direction which defines the search area in height is made as large as possible. The transmitting unit 5 is adjusted in such a way that it radiates horizontally in substantially the same direction in which the target axis of the tachymeter 1 points.

The receiver arrangement 11 at the target location is shown in FIG. 3. An objective 21 and a receiver 22 are arranged subsequent to a filter 20. The filter 20 is transparent only for a light wavelength range around the transmission wavelength of the laser 14. The receiver 22 is arranged in the focal plane of the objective 21. The focal length of the objective 21 is selected according to known optical principles in such a way that the receiver 22 can only receive light from a limited angle 23 of several degrees corresponding to the accuracy by which a reflector 10 can usually be aligned with the tachymeter 1. The receiver 22 is followed by an electronic unit 12, not shown in more detail, which contains an amplifier whose bandwidth is limited to a range around the modulating frequency of the laser 14. When the signal exceeds a threshold, reception is reported to the rodman by a beep. Further, reception is conveyed to the data radio unit 13 at the reflector rod 9 at the target location.

The method proceeds as follows: The rodman directs the reflector 10 in the horizontal and vertical direction to the tachymeter 1. The receiver unit 11 connected with the reflector is accordingly also aligned with the tachymeter 1 in such a way that the receiver 22 can receive light from the laser 14 of the transmitting unit 5 when it is sent in the direction of the receiver 22.

When target seeking is required for a determined reflector 11, a data radio link to the data radio unit 13 at this reflector 10 is formed by the tachymeter 1. If a plurality of reflectors are being used, a reflector and its receiver unit 11 are selected already by the data radio reception and only that receiver unit 11 is switched on. Additional reflectors and the receiver units arranged thereon can accordingly not be accidentally sighted, because neither their data radio links nor the receiver units are active.

The receiver arrangement 11 reports its reception readiness to the tachymeter 1 via the data radio unit 13. The tachymeter then starts to rotate about the standing axis 2. The respective horizontal angle values are simultaneously stored at fixed time intervals during the rotation.

When the light bundle 7 of the transmitter unit 5 sweeps over the receiver unit 11 during the rotation of the tachymeter 1 about the standing axis 2, it reports via the electronic unit 12 and the data radio unit 13 that it has been hit by the light bundle 7 of the transmitting unit 5. At the same time, the time of impingement $t_1$ is noted in a memory, not shown more fully, of the electronic unit 12. This can be effected, in a manner known per se, by a timer circuit or a computer clock. The tachymeter 1 brakes its rotating movement after reception of the report of the receiver unit 11 and begins to rotate in the opposite direction.

When the light bundle 7 of the transmitting unit 5 hits the receiver a second time at time $t_2$, this is, in turn, reported back to the tachymeter 1. In addition, the time $t=t_2-t_1$ which has passed in the electronic unit 12 between the two hits, is likewise sent to the tachymeter 1.

FIG. 4 shows schematically an angle-time diagram from the horizontal angle values stored during the rotating movement of the tachymeter 1 around the standing axis 2. The time point $t_1$ is not known by the tachymeter 1 directly, since a time delay that is variable and not known exactly must be assumed for the data radio link because of the data radio log. Thus, the horizontal angle at the time point at which the tachymeter 1 receives the first report of a hit is not the angle at which the reflector 10 with receiver arrangement 11 is to be found. An unequivocal correlation is made possible only by the time difference $t_2-t_1$ transmitted with the second hit because there is only one pair of horizontal angles within time interval $t_2-t_1$ that are identical within the framework of a tolerance dependent on the parameters of the measurement system. The tachymeter 1 is adjusted to this horizontal angle 24.

For the subsequent search in the vertical angle, the laser 14 of the transmitting unit 5 is switched off. The search in the vertical angle is carried out by a second modulated light bundle 25 which is emitted from the telescope 3 of the tachymeter 1 in the telescope target axis with a search angle 26 having approximately the same magnitude in the horizontal and vertical dimensions. The generation of a light bundle in the telescope target axis is not shown in more detail in this case, since such arrangements are known. They are used for known tracking devices or as search beams in the tachymeter telescope. The aperture angle 26 must be large enough so that the receiver arrangement 11 is hit when the telescope 3 is rotated about the trunnion axis 4. For this purpose, an aperture angle of less than one degree is sufficient.

The search in the vertical angle is accordingly carried out in a manner analogous to that in the horizontal angle, except that in this case the telescope 3 of the tachymeter 1 is swiveled in an angle in the vertical direction, the vertical angle values are stored and, after the receiver arrangement 11 has been hit twice by the light bundle 25 from the telescope 3, the evaluation is carried out corresponding to FIG. 4. The swiveling of the telescope 3 can be limited to the range defined by the aperture angle 18 of the transmitter unit 5 (FIG. 2) because the horizontal angle search can only be successful in this range.

After evaluation, the telescope 3 can be swiveled to the calculated vertical angle until the continuous signal is present at the receiver arrangement 11. Further, the telescope 3 is adjusted downward slightly in the vertical angle until, instead of the receiver arrangement 11, the reflector 10 located below the latter lies in the target axis. Further precision sighting of the reflector 10 can be carried out in a manner known per se by a suitable receiver in the focal point of the telescope 3 (not shown), e.g., a CCD camera or a quadrant photoreceiver.

The invention is not limited to the described embodiment example. The transmitting unit 5 can also be integrated in the telescope 3. This would have the advantage that the search is not limited to the vertical angle range defined by the aperture angle 18.

When the data radio units can ensure a sufficiently fast transmission, the method according to FIG. 4 can be simplified. After a hit is reported, the rotational speed of the tachymeter 1 can be sharply reduced during reversal of the rotating direction such that the telescope 3 can be adjusted directly on the continuous signal at the receiver arrangement 11.

Further, the horizontal or vertical angle at which the light bundle is emitted can be modulated to the light bundle in coded manner. In this case, a demodulating device which allows the angle to be determined directly and sent via the data radio unit 13 to the tachymeter 1 follows the receiver arrangement 11.

It is further possible to use the device according to the invention for staking out. In this case, the tachymeter 1 is rotated about its standing axis 2 in such a way that the light bundle 7 points in the direction to be staked out. The receiver arrangement 11 is activated via the data radio unit 13. The rodman then moves over the ground with the reflector rod 9 and the receiver arrangement 11 is approximately aligned with the tachymeter 1. When the receiver arrangement 11 reaches the stake-out line, and therefore the light bundle 7, the rodman is alerted that the stake-out line is reached by a beep triggered by the receiver arrangement 11.

It is also possible to stake out by sighting the selected reflector 10 by means of the device according to the invention and the stake-out difference is then calculated in the tachymeter 1. The stake-out difference can then be sent to the electronic unit 12 via the data radio unit 13 and displayed on a display of the electronic unit 12.

While the foregoing description and drawings represent the preferred embodiments of the present invention, it will be obvious to those skilled in the art that various changes and modifications may be made therein without departing from the true spirit and scope of the present invention.

What is claimed is:

1. A method for target seeking in geodetic survey measurements, comprising the steps of:

generating at least a first light bundle by a measurement device from a light source arranged therein, said light bundle periodically pivoting back and forth or revolving about the standing axis of the measurement device and fanning out in the vertical plane and being sent to at least one receiver arrangement arranged in at least one target station arranged at a distance from the measurement device;

generating an electrical signal when the light bundle hits the receiver arrangement of the at least one target station;

conveying these electrical signals generated in the target station, or the time difference determined from these electrical signals, to the measurement device through a transmitting device provided in the target station;

determining the horizontal angle to the respective sighted target station from the time difference of two electrical signals generated one after the other in time by means of angles measured or stored at constant time intervals;

pivoting a second modulated light bundle at an angle in the vertical plane and sending it in the direction of the target station for determining the vertical angle of the measurement device; and when the second light bundle hits the receiver arrangement in the target station, generating another electrical signal and sending it to the measurement device and determining the vertical angle to the respective target station therefrom in the measurement device.

2. The method according to claim 1, wherein said second modulated light bundle has a width and height that are substantially the same; and said method further comprises the step of directing, prior to pivoting the second modulated light bundle, the second modulated light bundle at the determined horizontal angle.

3. A device for target seeking for geodetic survey devices which have a telescope and form the measurement station and which communicate with at least one target station, wherein the geodetric device is rotatable about a standing axis and comprises:

means for generating at least one light bundle to be sent in the target station;

a receiver arrangement being provided at the target station, said receiver arrangement for generating electrical signals when the light bundle impinges;

transmission and reception devices being provided at the measurement station and at the target station for transmitting information and signals;

a transmitting unit connected with the geodetic device being provided for generating a first light bundle which is fanned out in the vertical direction and pivotable in the horizontal plane;

said telescope of the device, which telescope is pivotable about a trunnion axis being provided for generating a second light bundle in a vertical plane;

a data radio unit being arranged at the measurement station and serving to receive signals sent from the target station; and a photoelectric receiver arrangement, a reflector and an electronic unit with storage and data radio unit being arranged at the target station for storing and conveying data and signals to the measurement station.

4. The device according to claim 3, wherein the transmitting unit of the measurement station has a light source, a collimating objective, and an optical system which expands the first light bundle in the vertical plane and which has a cylindrical lens.

5. The device according to claim 3, wherein the receiver arrangement of the target station comprises an objective and an arrangement having CCD elements or a spatially sensitive photoreceiver, wherein a light filter is arranged before the objective, and the receiver arrangement is connected with the electronic unit and with the data radio unit.

6. The device according to claim 3, wherein the light of the light bundles is modulated.

7. The device according to claim 3, wherein the measurement station includes means for determining a horizontal angle to the target station from the information and signals transmitted to the measurement station; the second light bundle generated by the telescope has a width and height that are substantially the same; and said telescope further includes means for directing, prior to pivoting the telescope about the trunnion axis, the second light bundle at the determined horizontal angle.

* * * * *